United States Patent
Chen

(10) Patent No.: US 8,838,373 B2
(45) Date of Patent: Sep. 16, 2014

(54) SCHEDULE MANAGEMENT DEVICE AND METHOD

(75) Inventor: Yi-Ching Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 772 days.

(21) Appl. No.: 13/095,867

(22) Filed: Apr. 28, 2011

(65) Prior Publication Data

US 2012/0232786 A1 Sep. 13, 2012

(30) Foreign Application Priority Data

Mar. 10, 2011 (CN) .......................... 2011 1 0057883

(51) Int. Cl.
*G01C 21/00* (2006.01)
*G06Q 10/10* (2012.01)

(52) U.S. Cl.
CPC .......... *G06Q 10/109* (2013.01); *G06Q 10/1095* (2013.01); *G06Q 10/1093* (2013.01); *G06Q 10/10* (2013.01)
USPC .......................... 701/400; 705/7.18; 705/7.13

(58) Field of Classification Search
CPC ............ G06Q 10/1093; G06Q 10/109; G06Q 10/1095; G06Q 10/0631; G06Q 10/10
USPC ............... 705/2, 7.18; 455/456.3, 466, 412.1; 700/300; 701/540, 414, 423, 533; 382/254; 707/732; 348/144, 207.2; 342/59; 715/744
See application file for complete search history.

(56) References Cited

U.S. PATENT DOCUMENTS

| | | | |
|---|---|---|---|
| 8,112,299 B2* | 2/2012 | Kim et al. | 705/7.18 |
| 8,131,718 B2* | 3/2012 | Tran | 707/732 |
| 8,457,895 B2* | 6/2013 | Hong et al. | 701/540 |
| 2005/0182722 A1 | 8/2005 | Meyer et al. | |
| 2010/0030612 A1* | 2/2010 | Kim et al. | 705/9 |
| 2010/0082230 A1* | 4/2010 | Hong et al. | 701/201 |

FOREIGN PATENT DOCUMENTS

TW 200922264 A 5/2009
TW 200939060 A 9/2009

* cited by examiner

*Primary Examiner* — Behrang Badii
(74) *Attorney, Agent, or Firm* — Novak Druce Connolly Bove + Quigg LLP

(57) ABSTRACT

A schedule management device includes a processing unit and a storage unit for storing schedule list recording events, each of which includes event content, event date and position information. The processing unit includes a position information acquiring module, a position information comparing module, a date information judging module and a display module. The position information acquiring module acquires position information of the event(s). The position information comparing module determines whether the position information of the event(s) and the schedule management device belong to a same area. The date information judging module judges whether the current date information is a predetermined date before the event date when the position information of the event(s) and the schedule management device don't belong to the same area. The display module displays the event content of the event(s) when the current date information is the predetermined date before the event date.

10 Claims, 3 Drawing Sheets

SCHEDULE MANAGEMENT DEVICE AND METHOD

BACKGROUND

1. Technical Field

The present disclosure relates to schedule management devices and, particularly, to a schedule management device and a schedule management method which manages schedules based on position information and date information.

2. Description of Related Art

In general, schedule management devices are used to create a schedule list by recording a number of events associated with date information, and inform users of the upcoming event(s) when the date information of the event(s) falls within current date information. However, the schedule management devices cannot inform the user about the event(s) whose scheduled date is before the predetermined date.

Therefore, what is needed is a schedule management device and a schedule management method to overcome the described limitations.

DETAILED DESCRIPTION

Figure 1:
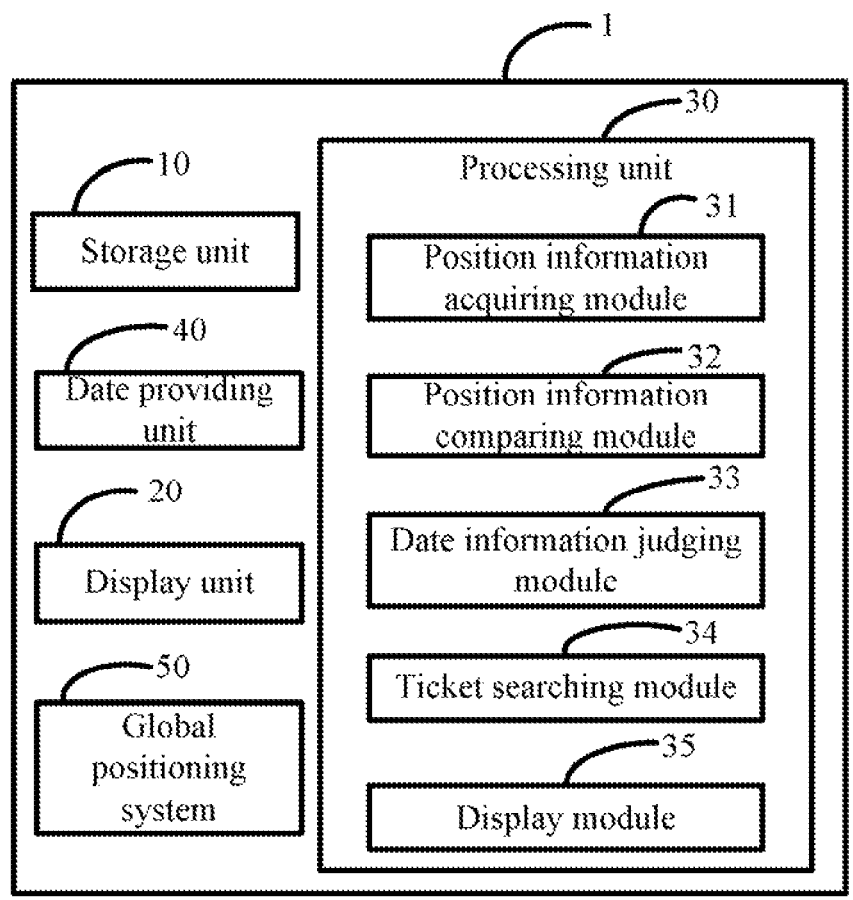
FIG. 1 is a block diagram of a hardware infrastructure of a schedule management device in accordance with an exemplary embodiment.

Referring to FIG. 1, a schedule management device 1 is provided. The schedule management device 1 includes a storage unit 10, a date information providing unit 40, a GPS (global positioning system) 50, a processing unit 30, and a display unit 20. The date providing unit 40 is configured for providing current date information. The GPS 50 is configured for providing position information of the schedule management device 1.

The storage unit 10 is configured for storing a schedule list which records a number of events. Each event includes event content, an event date, and position information where the event occurs.

The processing unit 30 includes a positioning information acquiring module 31, a position information comparing module 32, a data information judging module 33, and a display module 35.

The position information acquiring module 31 is configured for acquiring the position information of the event(s) in the schedule list stored in the storage unit 10.

The position information comparing module 32 is configured for determining whether the acquired position information of the event(s) and the position information of the schedule management device 1 don't belong to a same area, for example, a same city, a same province, a same country. In other embodiments, the position information comparing module 32 further determines whether the distance between the position information of the event(s) and the schedule management device 1 is in a predetermined range. If the distance between the position information of the events and the schedule management device 1 is in a predetermined range, the position information comparing module 32 determines that the position information of the event(s) and the position information of the schedule management device 1 belong to the same area. Otherwise, the position information comparing module 32 determines that the position information of the event(s) and the position information of the schedule management device 1 do not belong to the same area.

The date information judging module 33 is configured for judging whether the current date information is a predetermined date before the event date of the event(s) when the acquired position information of the event (s) and the position information of the schedule management device 1 don't belong to the same area.

The display module 35 is configured for displaying the event content of the event(s) when the current date is the predetermined date before the event date on the display unit 20. For example, the current position of the schedule management device 1 is in Shenzhen HuaQiangBei, and the current date information is Mar. 13, 2011, the schedule list records an event whose position information is Shanghai LaoMiao, and event date is Mar. 15, 2011. The position information comparing module 32 determines that Shenzhen HuaQiangBei and Shanghai LaoMiao do not belong to the same area. The date information judging module 33 judges whether the current date information is the predetermined date before the event date of the event(s) when Shenzhen HuaQiangBei and Shanghai LaoMiao don't belong to the same area. The display module 35 displays the event content of the event(s) when the current date information is the predetermined date before the event date of the event(s).

Figure 2:
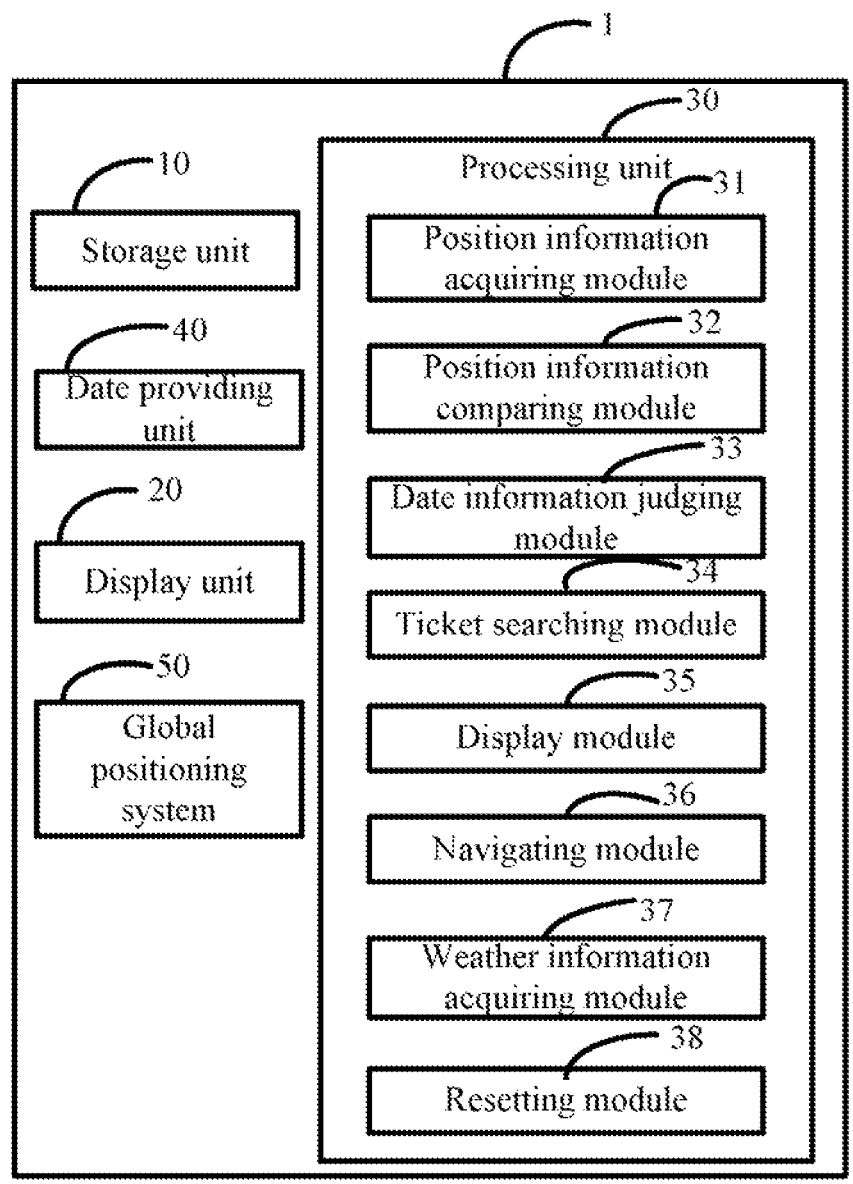
FIG. 2 is a block diagram of a hardware infrastructure of a schedule management device in accordance with another embodiment.

Referring to FIG. 2, the processing unit 30 further includes a ticket searching module 34. The ticket searching module 34 is configured for searching ticket-booking information based on the position information of the schedule management device 1 and the position information of the event(s) via a network when the current date information is the predetermined date before the event date of the event(s). The display module 35 is further configured for displaying the searched ticket-booking information on the display unit 20.

The processing unit 30 further includes a navigating module 36. The navigating module 36 is configured for providing a shortest route based on the position information of the schedule management device 1 and the position information of the event(s) via the GPS 50 when the position information of the event(s) and the schedule management device 1 belong to the same area and the current date information and the event date of the event (s) are on the same date. The display module 35 displays the provided shortest route on the display unit 20. For example, the position of the schedule management device 1 is in Shenzhen HuaQiangBei, and the current date information is Mar. 13, 2011, the schedule list record of an event whose position information is Shenzhen DongMen, and event date is Mar. 13, 2011. The position information comparing module 32 determines that Shenzhen HuaQiangBei and Shenzhen DongMen belong to the same area. The date information judging module 33 then judges whether the current date information and the event date of the event(s) are the same date. The navigating module 36 provides a shortest route from Shenzhen HuaQiangBei to Shenzhen DongMen when the current date information and the event date of the event(s) are the same date.

The processing unit 30 further includes a weather information acquiring module 37. The weather acquiring module 37 is configured for acquiring weather information of the position information of the event(s) when the current date information is the predetermined date before the event date of the event(s). The display module 35 is further configured for displaying the acquired weather information on the display unit 20.

The processing unit 30 further includes a resetting module 38. The resetting module 38 is configured for resetting the events of the schedule list stored in the storage unit 10.

Figure 3:
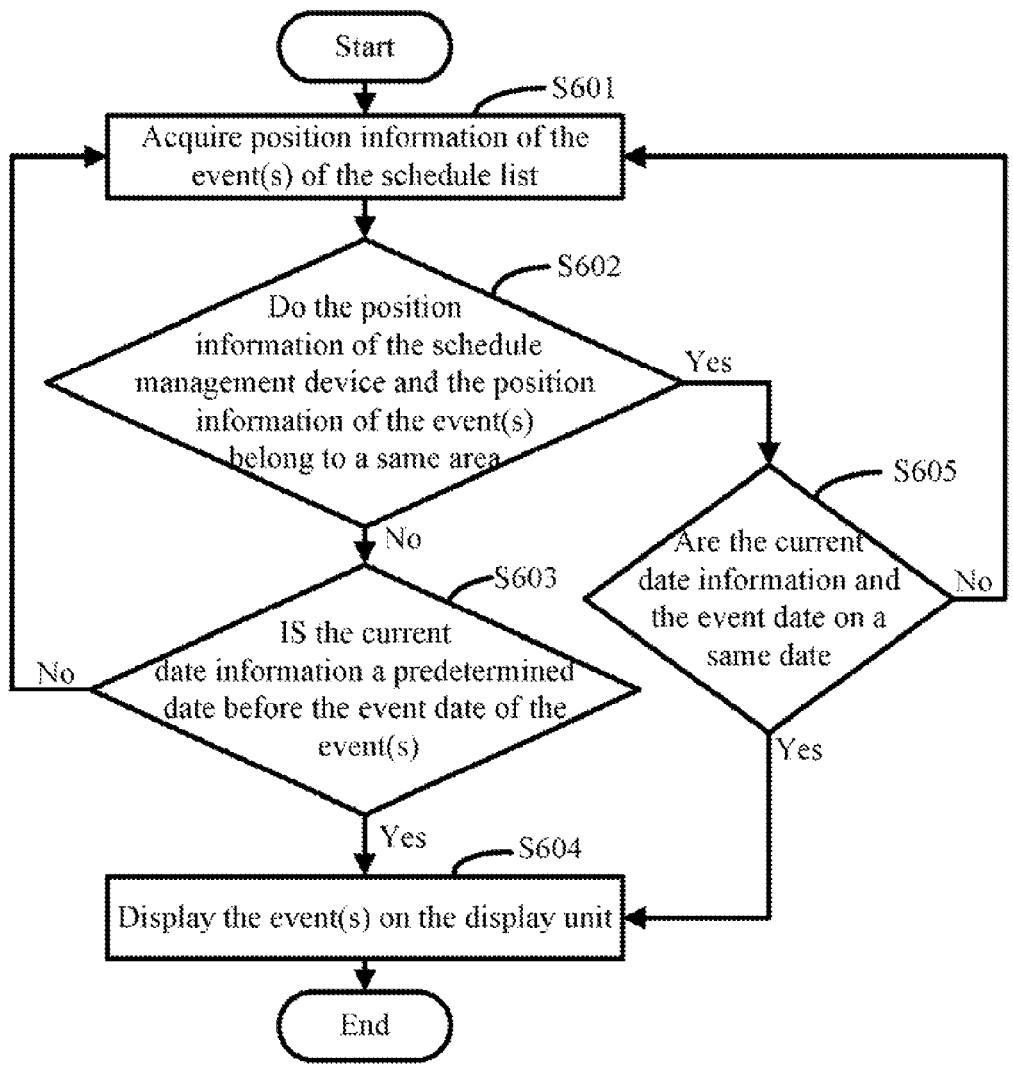
FIG. 3 is a flowchart of a method for managing schedules implemented by the schedule management device of FIG. 1 in accordance with exemplary embodiment.

FIG. 3 is a flowchart of a method for managing schedules implemented by the schedule management device of FIG. 1 in accordance with exemplary embodiment.

In step S601, the position information acquiring module 31 acquires the position information of the event(s) of the schedule list.

In step S602, the position information comparing module 32 determines whether the position information of the event(s) and the position information of the schedule management device 1 belong to the same area, if yes, the procedure goes to step S605, if no, the procedure goes to step S603.

In step S603, the date information judging module 33 judges whether the current date information is the predetermined date before the event date of the event(s), if yes, the procedure goes to step S604, if no, the procedure goes to step S601.

In step S604, the display module 35 displays the event content of the event(s) on the display unit 20.

In step S605, the date information judging module 33 judges whether the current date information and the event date of the event(s) are the same date, if yes, the procedure goes step S604, if no, the procedure goes S601.

In other embodiment, the method further includes following steps: the ticket searching module 34 searches ticket-booking information based on the position information of the schedule management device 1 and the position information of the event(s) via the network when the current date information is the predetermined date before the event date of the event(s), and the display module 35 displays the searched ticket-booking information on the display unit 20.

In other embodiments, the method further includes the following steps: the navigating module 36 provides a shortest route based on the position information of the schedule management device 1 and the position information of the event(s) via the GPS 50 when the position information of the event(s) and the position information of the schedule management device 1 belong to the same area and the current date information and the event date of the event(s) are the same date, and the display module 35 displays the provided shortest route on the display unit 20.

In other embodiments, the method further includes the following steps: the weather acquiring module 37 acquires weather information of the position information of the event(s) when the current date information is the predetermined date before the event date of the event(s), and the display module 35 displays the acquired weather information on the display unit 20.

In other embodiments, the method further includes the following step: the resetting module 38 resets the events of the schedule list stored in the storage unit 10.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A schedule management device comprising:
 a storage unit for storing a schedule list which records a plurality of events, each event comprising event content, an event date and a position information where the event occurs;
 a date providing unit for providing current date information;
 a GPS (global positioning system) for providing position information of the schedule management device;
 a display unit; and
 a processing unit comprising:
  a position information acquiring module for acquiring the position information of the event(s) of the schedule list stored in the storage unit;
  a position information comparing module for determining whether the position information of the event(s) and the position information of the schedule management device belong to a same area;
  a date information judging module for judging whether the current date information is a predetermined date before the event date of the event(s) when the position information of the event(s) and the position information of the schedule management device don't belong to the same area; and
  a display module for displaying the event content of the event(s) when the current date information is the predetermined date before the event date of the event(s).

2. The schedule management device as described in claim 1, wherein the processing unit further comprises a ticket searching module, the ticket searching module is configured for searching ticket-booking information based on the position information of the schedule management device and the position information of the event(s) via a network when the current date information is the predetermined date before the event date of the event(s), and the display module is further configured for displaying the searched ticket-booking information on the display unit.

3. The schedule management device as described in claim 1, wherein the processing unit further comprises a navigating module, the navigating module is configured for providing a shortest route from the position information of the schedule management device to the position of the event(s) via the GPS when the position information of the schedule management device and the position information of the event(s) belong to the same area and the current date information and the event date of the event(s) are on a same date, and the display module is further configured for displaying the shortest route on the display unit.

4. The schedule management device as described in claim 1, wherein the processing unit further comprises a weather information acquiring module, the weather information acquiring module is configured for acquiring weather information of the position of the event(s) when the current date information is the predetermined date before the event date of the event(s), and the display unit is further configured for displaying the acquired weather information on the display unit.

5. The schedule management device as described in claim 1, wherein the processing unit further comprises a resetting module, the resetting module is configured for resetting the event(s) of the schedule list stored in the storage unit.

6. A schedule management method for managing schedule implemented by a schedule management device, wherein the schedule management device comprises a display unit, a date information providing unit for providing current date information, a GPS (global positioning system) for providing position information of the schedule management device, and a storage unit for string a schedule list recording a plurality of events, each event comprises event content, an event date and a position information where the event occurs, the method comprising:

acquiring the position information of the event(s) of the schedule list stored in the storage unit;

determining whether the position information of the event(s) and the position information of the schedule management device belong to a same area;

judging whether the current date information is a predetermined date before the event date of the event(s) when the position information of the event(s) and the position information of the schedule management device don't belong to the same area; and displaying the event content of the event(s) when the current date information is the predetermined date before the event date of the event(s).

7. The schedule management method as described in claim 6, further comprising:

searching ticket-booking information based on the position information of the schedule management device and the position of the event(s) via a network when the current date information is the predetermined date before the event date of the event(s), and displaying the searched ticket-booking information on the display unit.

8. The schedule management method as described in claim 6, further comprising:

providing a shortest route from the position information of the schedule management device to the position information of the event(s) via the GPS when the position information of the schedule management device and the position of the event(t) belong to the same area and the current date information and the event date are on a same date, and displaying the shortest route on the display unit.

9. The schedule management method as described in claim 6, further comprising:

acquiring weather information of the position information of the event(s) when the current date information is the predetermined date before the event date of the event(s), and displaying the acquired weather information on the display unit.

10. The schedule management method as described in claim 6, further comprising:

resetting the event(s) of the schedule list stored in the storage unit.

* * * * *